(12) United States Patent
Amtmann

(10) Patent No.: US 7,295,629 B2
(45) Date of Patent: Nov. 13, 2007

(54) DATA CARRIER HAVING A CONTROLLABLE CARRIER-SIGNAL RECEIVING-MEANS CONFIGURATION

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 466 days.

(21) Appl. No.: 09/759,177

(22) Filed: Jan. 12, 2001

(65) Prior Publication Data

US 2002/0031031 A1    Mar. 14, 2002

(30) Foreign Application Priority Data

Jan. 17, 2000  (EP) .................................. 00890012

(51) Int. Cl.
*H03K 9/00*    (2006.01)
*G08B 23/00*   (2006.01)
(52) U.S. Cl. .................................. 375/316; 340/572.5
(58) Field of Classification Search ................ 375/257, 375/285, 316, 346, 377; 340/10.1, 572.5
See application file for complete search history.

(56) References Cited

U.S. PATENT DOCUMENTS 3,921,530 A  *  11/1975  Burkhardt et al. .......... 102/219
5,680,106 A  *  10/1997  Schrott et al. ........... 340/10.33
6,208,235 B1 *  3/2001  Trontelj .................... 340/10.1

FOREIGN PATENT DOCUMENTS

| DE | 19755250 A | 7/1999 |
|---|---|---|
| WO | WO9843218 | 10/1998 |

* cited by examiner

*Primary Examiner*—Kevin Kim

(57) ABSTRACT

A data carrier (DC) has a receiving-means configuration (RC) which includes a switching means (S) and a first transmission coil (L1), which can be short-circuited with the aid of the switching means (S), and at least one second transmission coil (L2), which is arranged in series with the first transmission coil (L1), and capacitor configuration (CC), which is arranged in parallel with at least the second transmission coil (L2), the receiving means configuration (RC) being configured to be controllable as regards the value of at least one of its elements comprising the at least one second transmission coil (L2) and the capacitor configuration (CC).

14 Claims, 2 Drawing Sheets

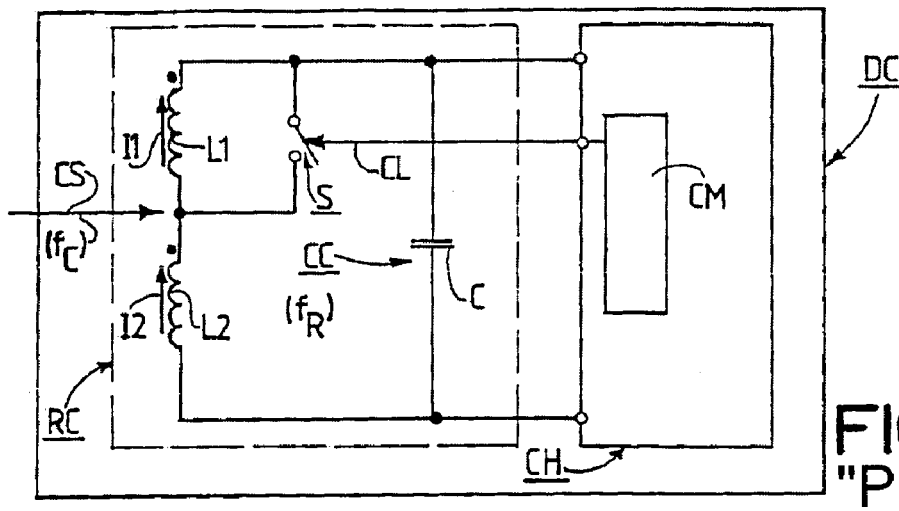
FIG.1 "Prior Art"
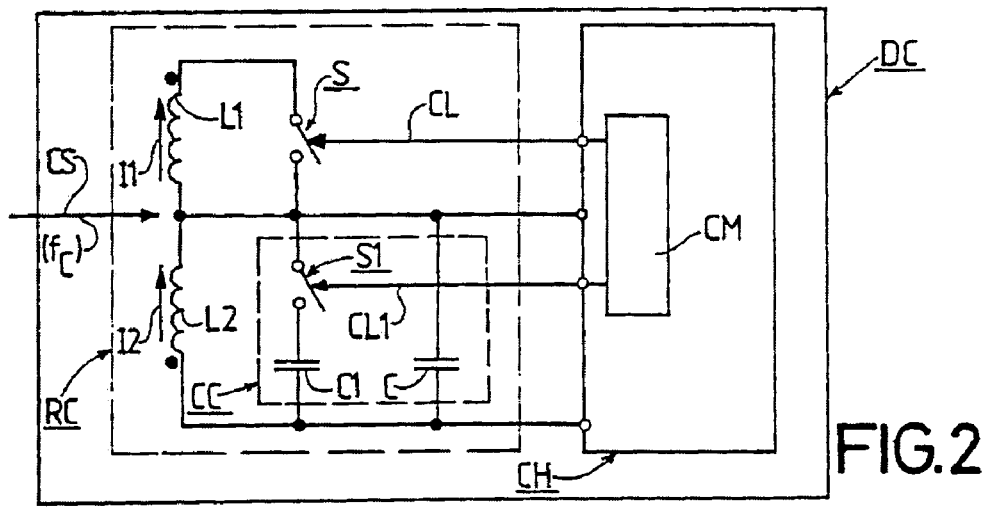
FIG.2
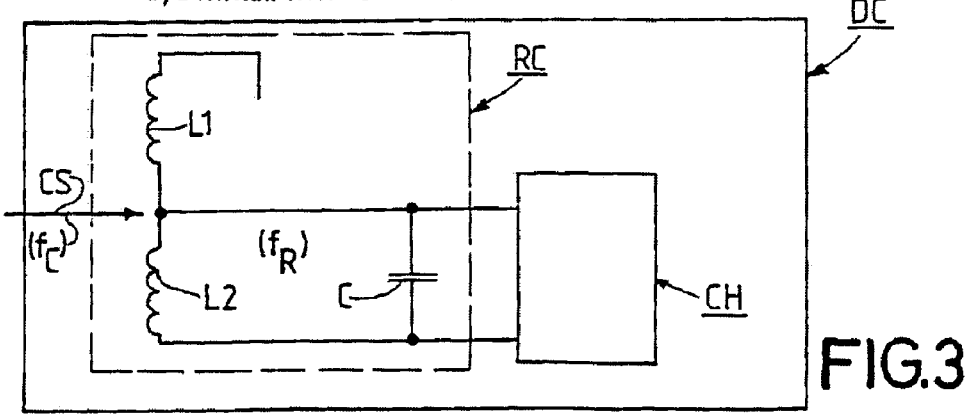
FIG.3

DATA CARRIER HAVING A CONTROLLABLE CARRIER-SIGNAL RECEIVING-MEANS CONFIGURATION

BACKGROUND OF THE INVENTION

The invention relates to a data carrier which is configured to communicate with a communication station with the aid of a carrier signal and which includes a receiving-means configuration having a switching means and having a first transmission coil that can be short-circuited and having a second transmission coil and having a capacitor configuration.

Such a data carrier is commercially available and is consequently known. The construction of the relevant part of the known data carrier is shown in FIG. 1.

The known data carrier DC includes a receiving-means configuration RC and a chip CH connected to the receiving-means configuration RC. The receiving-means configuration RC includes a switching means S, a first transmission coil L1 that can be short-circuited with the aid of the switching means S, a second transmission coil L2 arranged in series with the first transmission coil L1, and a capacitor configuration CC arranged in parallel with the series arrangement of the first transmission coil L1 and the second transmission coil L2. The capacitor configuration CC now consists of a capacitor C external to the chip CH and of the input capacitance of the chip CH, but this is shown as a single capacitor C in an equivalent diagram. The switching means S is switchable between a conductive switching state and a non-conductive switching state. The switching means S can be changed over with the aid of control means CM, which are incorporated in the chip CH and which are connected to the switching means S via a control line CL.

In a mode of communication between the data carrier DC and a communication station the switching means S is in its non-conductive switching state, as a result of which the two transmission coils L1 and L2 are arranged in series and this series arrangement of the two transmission coils L1 and L2 is arranged in parallel with the capacitor configuration CC. The two transmission coils L1 and L2 than have an inductance value and the capacitor configuration CC has a capacitance value, which inductance value and which capacitance value are selected in such a manner that the resonant circuit formed by the two transmission coils L1 and L2 and the capacitor configuration CC has a resonant frequency which corresponds to the carrier signal frequency $f_C$ of the carrier signal CS used in the communication process.

In a rest mode of the data carrier DC, when the data carrier DC is not in a mode in which it communicates with the communication station, flee switching means S is in its conductive state. When in this operating mode of the data carrier DC, i.e. in its rest mode, the data carrier DC enters into communication with a commutation station, this results in a coil current I1 through the first transmission coil L1, which is an inductive coil current having a phase lag with respect to the voltage across the first transmission coil L1. Furthermore, it results in a coil current I2 through the second transmission coil L2, i.e. a capacitive coil current having a phase lead with respect to the voltage across the second transmission coil L2. Each of these two coil currents I1 and I2 produces a magnetic field with the aid of the respective coil L1 or L2, which two magnetic fields attenuate one another, the aim being that the two magnetic fields cancel one another, so that owing to the desired cancellation of the two magnetic fields flee data carrier DC cannot have any adverse effect on the transmission coil of a nearby data carrier.

Owing to the selected design, which uses two fixed-value transmission coils L1 and L2 and a fixed-value capacitor configuration, which elements always exhibit a spread in value, it is substantially impossible with the known data carrier DC to obtain currents I1 and I2 through the two transmission coils L1 and L2 which cause magnetic fields which cancel one another. Thus, with the known data carrier DC the two transmission coils L1 and L2 always produce a residual magnetic field when the data carrier DC is in its rest mode, in which the switching means S is in tis conductive state, as a result of which the residual magnetic field exerts an undesired influence on a nearby data carrier, which undesired influence results in the resonant frequency $f_R$ no longer corresponding to the carrier signal frequency $f_C$, as a result of which the receiving means configuration RC of the nearby data carrier DC does not guarantee a correct reception of a carrier signal CS and, consequently, the generation of energy from the received carrier signal CS is not satisfactory, which leads to a distinct reduction of the range of a nearby data carrier DC when the nearby data carrier is set to its communication state, i.e. a communication mode, in which the switching means S of the nearby data carrier is set to its non-conductive state.

BRIEF SUMMARY OF THE INVENTION

It is an object of the invention to preclude the aforementioned problems and to provide simple and effective means in a data carrier of the type defined in the opening paragraph, by which means an improved data carrier is obtained.

In order to achieve this object with such a data carrier the receiving means configuration is configured to be controllable as regards the value of at least one of its elements comprising the at least one second transmission coil and the capacitor configuration.

In this way, it is achieved by simple means that by switching the value of the at least one second transmission coil or of the capacitor configuration, or also of all these elements of the receiving means, it is possible to obtain a coil current in the second transmission coil of a data carrier in accordance with the invention, which crescent leads with respect to the voltage across the second transmission coil and which by means of the second transmission coil produces a magnetic field whose magnitude corresponds exactly to the magnetic field produced by means of the first transmission coil but which is exactly phase-invoked with respect to this magnetic field, as a result of which the magnetic fields generated by means of the two transmission coils cancel one another almost completely, so flint in the rest mode of the data carrier in accordance with the invention, in which the switching means are in the conductive state, there is hardly any residual magnetic field and, consequently, a record carrier in accordance with the invention cannot exert a negative influence on a data carrier disposed near the data carrier in accordance with the invention. Thus, with a data carrier in accordance with the invention it is achieved in a simple manner that a data carrier in accordance with the invention cannot cause a shift in the resonant frequency of the receiving means of a nearby data carrier when the nearby data carrier is in its communication mode, as a result of which a data carrier in the proximity of a data carrier in accordance with the invention can communicate correctly without its range being limited, in spite of the immediate proximity of a data carrier in accordance with the invention.

It has proved to be very advantageous in a data carder in accordance with the invention if the capacitor configuration is configured to be controllable only as regards its capacitance value. This has proved to be advantageous in view of a simple realization and in view of a large number of control possibilities.

The capacitor configuration can be controlled in different manners, particularly if the capacitor configuration is realized with the aid of the chip connected to the receiving means configuration. However, it has proved to be particularly advantageous if controlling is effected by switching over, i.e. if the capacitor configuration is switchable as regards its capacitance value. This is particularly advantageous in conjunction with an implementation by means of integrated circuit technology. In the present context it has further proved to be very advantageous if a data carrier having a switchable capacitor configuration in addition has the characteristic features as defined in claim 4. Such a construction has proved to be advantageous in view of an embodiment which is as simple as possible and which can be realized by means of integrated circuit technology. In such an embodiment a plurality of capacitors having fixed capacitance can be arranged in parallel with the series arrangement of a further capacitor and a further switching means.

In a data carrier in accordance with the invention the capacitor configuration may be arranged in parallel with the series arrangement of the two transmission coils. However, it has proved to be particularly advantageous if the capacitor configuration is arranged in parallel only with the at least one second transmission coil. Such an embodiment has proved to be very advantageous in practical tests.

The above-mentioned as well as further aspects of the invention will become apparent from the embodiments described hereinafter by way of example and will be elucidated with reference to these examples.

BRIEF DESCRIPTION OF THE DRAWINGS

The invention will now be described in more detail with reference to the drawings, which show two embodiments given by way of example but to which the invention is not limited.

FIG. 1 is a block diagram which shows a prior-art data carrier.

FIG. 2 shows, in a manner similar to FIG. 1, a data carrier in accordance with a first embodiment of the invention.

FIG. 3 shows an equivalent diagram of the data carrier shown in FIG. 2, namely for the mode of operation in which the data carrier is in a mode of communication with a communication station.

DETAILED DESCRIPTION OF THE INVENTION

Figure 4:
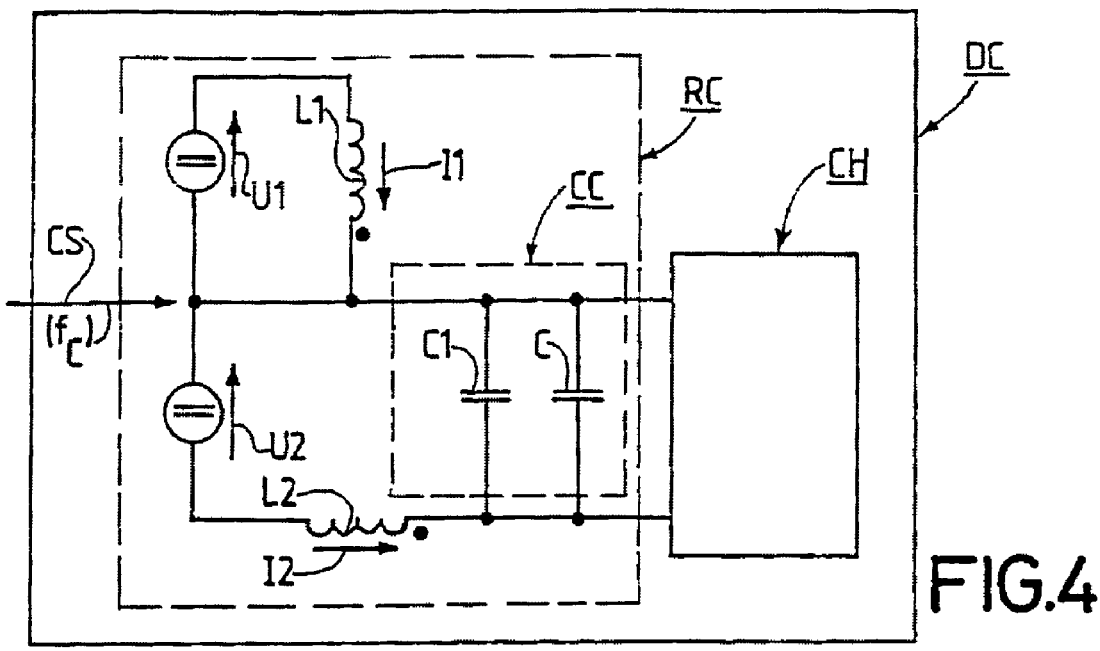
FIG. 4 shows, in a manner similar to FIG. 3, an equivalent diagram of the data carrier shown in FIG. 2, namely for the mode of operation in which the data carrier is in a rest mode.

FIG. 2 shows a dam carrier in accordance with a first embodiment of file invention. The data carrier DC is configured to communicate with a communication station, not shown, with the aid of a carrier signal CS having a given carrier signal frequency $f_C$. The data carrier DC includes a receiving-means configuration RC, which serves for receiving the carrier signal CS in a mode of the data carrier DC in which it communicates with a communication station. The receiving-means configuration RC is connected to a chip CH of the data carrier DC. The receiving-means configuration RC has a plurality of parts, which will be described in greater detail hereinafter.

The receiving-means configuration RC includes a switching means S, which formed by an electronic switch and which can be switched between a conductive switching state and a non-conductive switching state. To control or switch the switching means S the chip CH includes control means CM, which are connected to the switching means S via a control line CL.

The receiving means configuration RC further include a first transmission coil L1, which can be short-circuited with the aid of the switching means S.

The receiving means configuration RC further include a second transmission coil L2 arranged in series with the first transmission coil L1. It is also possible to provide more than two transmission coils, in which case at least one of these coils must be controllable or switchable as regards its value. In the present case the two-transmission coils L1 and L2 are arranged in the receiving-means configuration RC with opposite winding directions. However, this is not necessary, the two transmission coils L1 and L2 may alternatively be included in the receiving-means configuration RC with the same winding direction.

The receiving-means configuration RC further includes a capacitor configuration CC which, in the present case, is arranged in parallel with the second transmission coil L2 only. In this case, the capacitor configuration CC is advantageously controllable as regards its capacitance value, the control capability in the present case being a switching capability. The capacitor configuration CC includes a capacitor C and, connected in parallel with the capacitor C, a series arrangement of a further capacitor C1 and a further switching means S1. The further switching means S1 is also formed by an electronic switch and is switchable between a conductive switching state and a non-conductive switching state. In order to enable it to be switched over the further switching means S is connected, in a manner similar to the switching means S, to the further control means CM via a further control line CL1. It is to be noted that in the present case the capacitor configuration CC is arranged in parallel with the second transmission coil L2 only and is consequently arranged in series with the first transmission coil L1, which is connected in series with the second transmission coil L2.

When the data carrier DC is set or switched to its communication mode as illustrated in FIG. 2, the switching means S and the further switching means SI are set to their non-conductive switching stales, which results in the equivalent diagram shown in FIG. 3 for the data carrier DC shown in FIG. 2. As is apparent from FIG. 3, only the second transmission coil L2 and the capacitor configuration CC are active when the communication mode is active. The inductance value of the second transmission coil L2 and the capacitance value of the capacitor configuration CC in the data carrier DC shown in FIG. 2 is selected so as to obtain for the parallel resonant circuit formed by the second transmission coil L2 and the capacitor configuration CC a resonant frequency $f_R$ which corresponds to the carrier signal frequency $f_C$ of the carrier signal CS transmitted by a communication station and received by the data carrier DC. This guarantees an optimum power generation in the data carrier DC with the aid of the received carrier signal CS and a correct data transfer between the communication station and the data carder DC.

The data carrier DC shown in FIG. 2 can be set or switched not only to a communication mode (see FIG. 3) but also to a rest mode, which will be explained with respect to FIG. 4, In the rest mode the switching means S and the further switching means S1 are each set or switched to their conductive switching states, namely with the aid of the control means CM. This results in the equivalent diagram of FIG. 4 for the rest mode. In this rest mode the situation may arise that the data carrier DC is within a range of communication with a communication station although no communication is required between the data carrier DC and the communication station. This may be the case, for example, when a plurality of data carriers in accordance with the invention are disposed or arranged directly adjacent one another, of which plurality of data carriers which are arranged directly adjacent one another always only one data carrier DC should or is allowed to be in communication with the communication station. This operational situation may arise, for example, when a data carrier DC in accordance with the invention is attached to a sheet of paper, the sheets which each have a data carrier DC in accordance with the invention attached to it being stacked onto one another.

When a data carrier DC, when in its rest mode, in which the switching means S and the further switching means SI are in their conductive switching states, is within a range of communication with a communication station, this results in a coil current I1 through the transmission coil L1, which current has a phase lag with respect to the voltage U1 across the first transmission coil L1, and in a coil current I2 through the second transmission coil L2, which current has a phase lead with respect to the voltage U2 across the second transmission coil L2. The lagging coil current I1 is an inductive current and the leading coil current I2 is a capacitive current. The lagging coil current I1 through the transmission coil L1 and the coil current I2 through the second transmission coil L2 produce two magnetic fields, which cancel one another owing to the choice of the inductance values of the two transmission coils L1 and L2 and owing to the choice of the capacitance values of the capacitors C and C1, as a result of which in the rest mode (see FIG. 4) of the data carrier DC no residual magnetic fields are produced by the data carrier DC, which ensures that the data carrier DC cannot exert an undesired influence on a directly adjacent data carrier by means of a spuriously emitted residual magnetic field.

Figure 5:
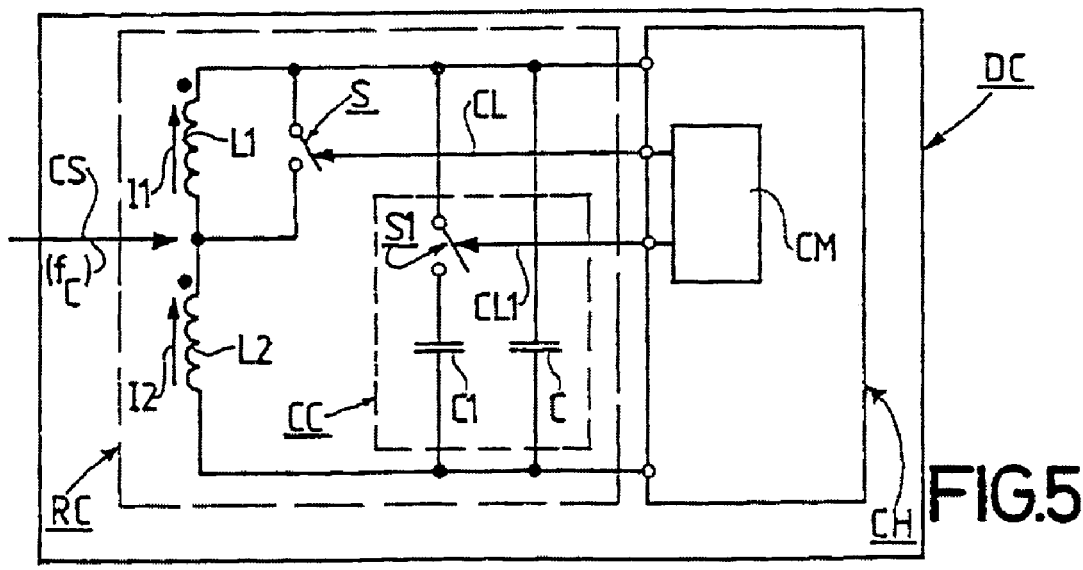
FIG. 5 shows, in a manner similar to FIG. 2, a data carrier in accordance with a second embodiment of the invention.

FIG. 5 shows a data carrier DC in accordance with a second embodiment of the invention. The data carrier shown in FIG. 5 differs from the data carrier DC shown in FIG. 2 in that the capacitor configuration CC is arranged not only in parallel with the second transmission coil L2 but the capacitor configuration CC is also arranged in parallel with the series arrangement of the first transmission coil L1 and the second transmission coil L2.

Both with the data carrier DC shown in FIG. 2 and with the data carrier DC shown in FIG. 5 it is achieved in a simple and very reliable manner and by simple means that in the rest mode of each of these data carriers DC no undesired residual magnetic fields can be generated or caused by means of the transmission coils LI and L2 of these data carriers DC, as a result of which the data carriers DC in accordance with the invention correct exert any undesired influences caused by the data carriers DC in accordance with the invention on data carriers disposed directly adjacent a data carrier DC in accordance with the invention.

It is to be noted that the switching means S and S1 and the capacitors C and CI can also be realized by means of the chip CH, i.e. intranlly in the chip.

In a possible modification of a data carrier in accordance with the invention the capacitor C may be arranged only in parallel with the second transmission coil L2 of the series arrangement of the two transmission coils L1 and L2 and the second capacitor C1. It is also possible, to arrange the further capacitor C1 only in parallel with the second transmission coil L2 of the series arrangement of the two transmission coils LI and L2 and the capacitor C.

The invention claimed is:

1. A data carrier configured to communicate with a communication station with the aid of a carrier signal having a given carrier signal frequency, the data carrier being operable in a first mode in which it communicates with the communication station and in a second mode in which it does not communicate with the communication station, the data carrier comprising:

receiving circuitry for receiving the carrier signal, the receiving circuitry including
a first switch and a second switch that are both switchable between a conductive switching state and a non-conductive switching state, the first and second switches being in the non-conductive switching state responsive to the data carrier being in the first mode of operation and the first and second switches being in the conductive switching state responsive to the data carrier being in the second mode of operation,
a first transmission coil that can be short-circuited with the aid of the first switch, through which first transmission coil a coil current flows when the data carrier is in the second mode of operation, the coil current through the first transmission coil having a phase lag with respect to a voltage across the first transmission coil, and
a capacitor configuration arranged in parallel with at least one second transmission coil, the capacitor configuration causing a coil current through the at least one second transmission coil when the data carrier is in the second mode of operation, the coil current through the at least one second transmission coil having a phase lead with respect to a voltage across the at least one second transmission coil, characterized in that: the receiving circuitry is configured to be controllable by an impedance value due to control over both the at least one second transmission coil and the capacitor configuration, the controllable impedance value being selected so that, when the data carrier is in the second mode of operation, cancellation is provided of respective magnetic fields associated with the first transmission coil and the at least one second transmission coil.

2. A data carrier as claimed in claim 1, characterized in that the capacitor configuration is configured to be controllable as regards its capacitance value.

3. A data carrier as claimed in claim 1, characterized in that the capacitor configuration is configured to be controllable only as regards its capacitance value.

4. A data carrier as claimed in claim 1, characterized in that the capacitor configuration includes a first capacitor and at least one series arrangement comprising:
a second capacitor and the second switch arranged in parallel with the first capacitor.

5. A data carrier as claimed in claim 1, characterized in that the capacitor configuration is arranged in series with the first transmission coil.

6. A data carrier as claimed in claim 1, characterized in that the capacitor configuration is arranged in parallel with both the at least one second transmission coil and the first transmission coil.

7. A data carrier as claimed in claim 1, wherein the receiving circuitry further includes plural second transmission coils, at least one of which is controllable.

8. A data carrier as claimed in claim 6, wherein the receiving circuitry further includes plural second transmission coils, at least one of which is controllable.

9. A data carrier configured to communicate with a communication station with the aid of a carrier signal having a given carrier signal frequency, the data carrier being operable in a first mode in which it communicates with the commutation station and in a second mode in which it does not communicate with the communication station, the data carrier comprising:

receiving circuitry for receiving the carrier signal, the receiving circuitry including a first switch and a second switch that are both switchable between a conductive switching state and a non-conductive switching state, the first and second switches being in the non-conductive switching state responsive to the data carrier being in the first mode of operation and the first and second switches being in the conducive switching state responsive to the data carrier being in the second mode of operation, a first transmission coil that is arranged so as to be short-circuited with the first switch in its conductive switching state, through which first transmission coil a coil current flows when the data carrier is in the second mode of operation, the coil current through the first transmission coil having a phase lag with respect to a voltage across the first transmission coil, and a capacitor configuration arranged to cause a coil current through at least one second transmission coil when the data carrier is in the second mode of operation, the coil current through the at least one second transmission coil having a phase lead with respect to a voltage across the at least one second transmission coil;

the receiving circuitry being configured so as to be controllable by an impedance value due to control over both the at least one second transmission coil and the capacitor configuration, the controllable impedance value being selected so that, when the data carrier is in the second mode of operation, cancellation is provided of respective magnetic fields associated with the first transmission coil and the at least one second transmission coil.

10. A data carrier as claimed in claim 9, wherein the capacitor configuration includes a first capacitor and at least one series arrangement comprising: a second capacitor and the second switch arranged in parallel with the first capacitor.

11. A data carrier as claimed in claim 9, wherein the capacitor configuration is arranged in series with the first transmission coil and arranged in parallel with at least one second transmission coil.

12. A data carrier as claimed in claim 10, wherein at least one of the capacitors is controllable.

13. A data carrier as claimed in claim 9, wherein the receiving circuitry further includes plural second transmission coils, at least one of which is controllable.

14. A data carrier as claimed in claim 11, wherein the receiving circuitry further includes plural second transmission coils, at least one of which is controllable.

* * * * *